April 2, 1968  J. MERCIER ET AL  3,375,844

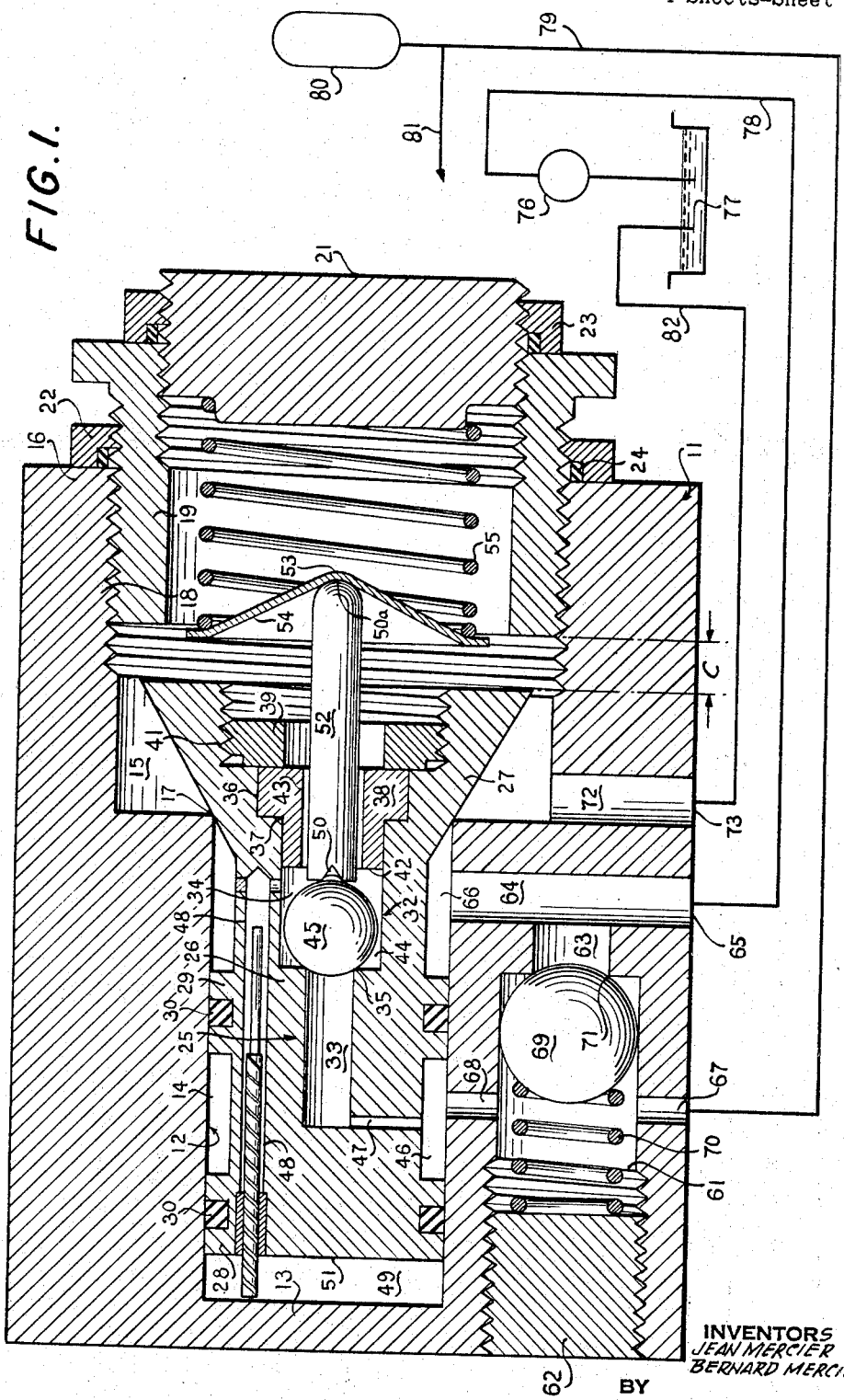

UNLOADER VALVE

Filed Nov. 25, 1964  4 Sheets-Sheet 2

INVENTORS
JEAN MERCIER
BERNARD MERCIER.
BY
Dean Fairbanks Hirsch
ATTORNEYS

INVENTORS
JEAN MERCIER
BERNARD MERCIER
BY
Dean Fairbank & Hirsch
ATTORNEYS

April 2, 1968  J. MERCIER ET AL  3,375,844
UNLOADER VALVE
Filed Nov. 25, 1964  4 Sheets-Sheet 4

INVENTORS
JEAN MERCIER
BERNARD MERCIER
BY
Dean, Fairbank & Hirsch
ATTORNEYS

United States Patent Office 3,375,844
Patented Apr. 2, 1968

3,375,844
UNLOADER VALVE
Jean Mercier and Bernard Mercier, both of 1185 Park
Ave., New York, N.Y. 10028
Filed Nov. 25, 1964, Ser. No. 413,698
Claims priority, application France, Dec. 18, 1963,
957,598, Patent 1,388,828
17 Claims. (Cl. 137—108)

ABSTRACT OF THE DISCLOSURE

The invention relates to the art of unloader valves, more particularly of the type to retain the pressure in a hydraulic system within adjustable predetermined limits and which may have such operating pressures varied even when the hydraulic system is in operation.

As conductive to an understanding of the invention, it is noted that in a hydraulic system having a pump which supplies fluid under pressure to a pressure accumulator for charging thereof to supply the hydraulic equipment to be actuated, it is important that the pressure in the system be maintained within predetermined limits and also that such pressure limits be readily adjustable in order to take care of different operating conditions.

It is among the objects of the invention to provide an unloader valve which may readily be incorporated into a hydraulic system, which valve has few simple parts and may readily be fabricated at relatively low cost and may readily be assembled and disassembled for maintenance, which valve may readily be set at desired maximum and minimum operating pressures, and may have such operating pressures varied even when the hydraulic system is operating and which may provide an extremely small pressure differential between maximum and minimum operating pressures.

According to the invention these objects are accomplished by the arrangement and combination of elements hereinafter described and more particularly recited in the claims.

Figure 1A:
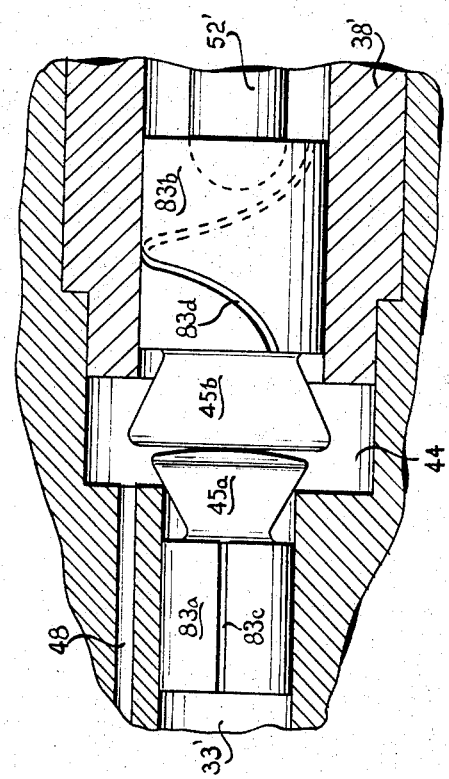
Figure 4:
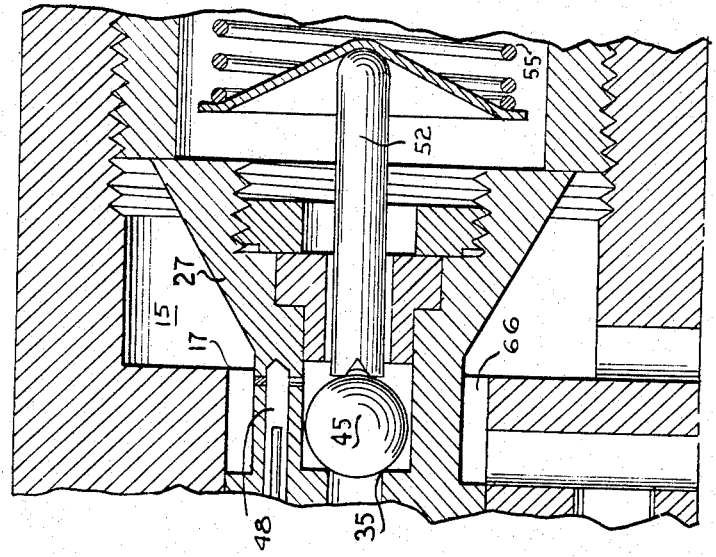
Figure 5:
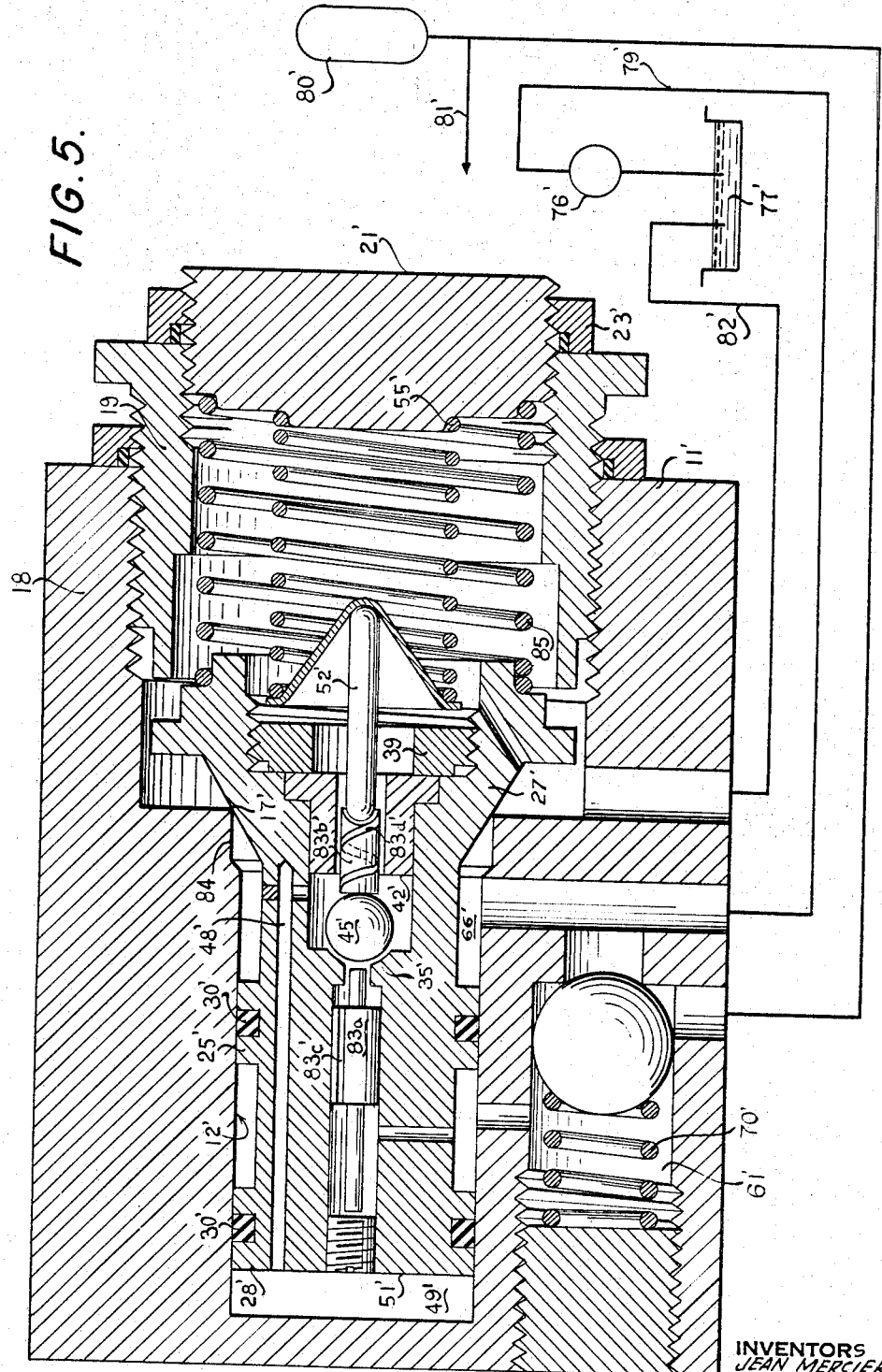

In the accompanying drawings in which are shown one or more of various possible embodiments of the several features of the invention, FIG. 1 is a longitudinal sectional view of an unloader valve according to one embodiment of the invention, FIG. 1a is a detail view of a modification of the embodiment of FIG. 1, FIGS. 2 to 4 are fragmentary sectional views illustrating the various stages of operation of the unloader valve of FIG. 1, and FIG. 5 is a view similar to FIG. 1 of another embodiment of the invention.

Referring now to the drawings, as shown in FIG. 1, the unloader valve comprises a casing 11 having a bore 12 extending therethrough, said bore being closed at one end as at 13.

The bore 12 has a reduced diameter portion 14 adjacent the closed end 13 thereof and a larger diameter portion 15 adjacent the open end 16 thereof, the end of bore portion 14 adjacent bore portion 15 defining a valve seat 17.

The bore portion 15 is internally threaded as at 18 to receive the correspondingly threaded end of a sleeve 19 and a threaded plug 21 is screwed into the internally threaded outer end of sleeve 19. Desirably lock nuts 22, 23 are provided to retain the sleeve 19 and plug 21 in set position, O rings 24 being associated with each of said lock nuts to provide seals.

Slidably mounted in the bore 12 is a cylindrical plunger 25 having a body portion 26 and a head portion 27. The periphery of body portion 26 has two spaced annular flanges 28, 29, each of which has an annular groove in which O rings 30 are positioned to form seals between the plunger 25 and the wall of bore 12.

The head portion 27 of the plunger 25 is frusto-conical in shape and the outer surface thereof is designed to abut against seat 17.

The plunger 25 has an axial bore 32 extending through the head portion 27 thereof into body portion 26. The bore 32 is of the smallest diameter as at 33 at the portion thereof remote from head portion 27. It has a portion 34 adjacent portion 33 of larger diameter defining a valve seat 35. The bore is of further enlarged diameter as as 36 to define a shoulder 37 against which abuts the corresponding shoulder of a hollow plug 38, the latter being retained in position by an externally threaded nut 39 screwed into the interally threaded end 41 of bore 32.

The space between the valve seat 35 and a valve seat 42 defined by the adjacent end of the bore 43 of plug 38, forms a pilot chamber 44 in which a ball 45 is positioned with little clearance with respect to the wall surface of chamber 44, said ball being movable between said seats 35, 42. The seat 42 is of area greater than that of seat 35, illustratively at least 20% greater.

The bore portion 33 defines a chamber that is in communication with the annular chamber 46 between flanges 28, 29 by means of a passageway 47. A longitudinal passageway 48 extends between pilot chamber 44 and the chamber 49 defined between the end 13 of bore 12 and the adjacent end 51 of plunger 25, said chamber 49 defining an expansion chamber.

The ball 45 is normally retained against its seat 35 to close the latter, by means of a pin 52 which fits with relatively great clearance in the bore 43 of plug 38. One end of pin 52 has a tapered recess 50 and abuts against ball 45 and the other end 50a is seated in the central concavity 53 of a follower disc 54. A coil spring 55 is compressed between disc 54 and the plug 21, rotation of the latter determining the force exerted by spring 55.

With this arrangement the pin 52 is supported so as to remain axially aligned with bore 43 to prevent frictional engagement therewith.

The casing 11 has a longitudinal bore 61 laterally spaced from bore 12. One end of bore 61 is closed by a threaded plug 62 and the other end has a passage 63 extending into a transverse passageway 64 which defines the pressure inlet passageway. Passageway 64 has an inlet port 65 at one end and its other end extends into an annular chamber 66 defined between annular flange 29 and head portion 27 of the plunger 25, said chamber 66 defining the pressure chamber.

The bore 61 has a port 67 and in addition a passageway 68 extends from bore 61 into chamber 46.

A ball 69 positioned in bore 61 is retained by spring 70 against the seat 71 defined by passageway 63 to close the latter, the tension of spring 70 being set by plug 62.

The system is designed to discharge fluid from the discharge chamber defined by bore portion 15 through a transverse passageway 72, the outer end of which defines the outlet port 73 of the valve.

The valve above described is incorporated in a hydraulic circuit, illustratively of the type shown in FIG. 1. Thus, such circuit comprises a pump 76 having its inlet connected to reservoir 77 and its outlet connected by line 78 to port 65 of the valve. The port 67 of the valve is connected by line 79 to a pressure accumulator 80 which may be of any conventional type and which in turn is connected to the hydraulic equipment to be actuated by line 81 and the discharge port 73 of the valve is connected by line 82 to the reservoir.

When the pump 76 is operating, it will force fluid under pressure from the reservoir 77 through line 78 into port 65 of the valve. The fluid flowing through passageway 64 will enter annular chamber 66 and pressure will build up in said chamber 66 and in passageway 64 equal to the pump pressure at the time.

As a result of the pressure in passageway 64 and hence in passageway 63 reacting against spring urged ball 69, the latter will be moved off its seat 71 as the pump pressure against the side of the ball on seat 71 will exceed the accumulator pressure against the other side of the ball and the force of spring 70 is negligible, the latter merely holding ball 69 in its seat when the pressure on opposed sides of ball 69 are equal. Thus, the fluid under pressure will flow into chamber 61 and also through port 67 and line 79 to charge the accumulator 80 and flow through line 81 to the hydraulic system to be actuated.

In addition, the fluid under pressure will flow through passageway 68 into annular chamber 46 and thence through passageway 47 into the chamber 33 of plunger 25 to react against the ball 45.

Based upon the force F–1 exerted by spring 55 through pin 52 against ball 45, which force is set by plug 21, the ball 45 will remain on its seat 35 until the pressure in chamber 33 which is the pump pressure and the accumulator pressure at this time, builds up to a value P–1 such that the force F–2 resulting from the product of the fluid pressure in chamber 33 and the area of seat 35 exceeds the force exerted by spring 55.

This pressure P–1 is the maximum pressure at which it is desired the accumulator 80 to be charged and the maximum pressure to be supplied to the hydraulic system to be actuated.

Figure 2:
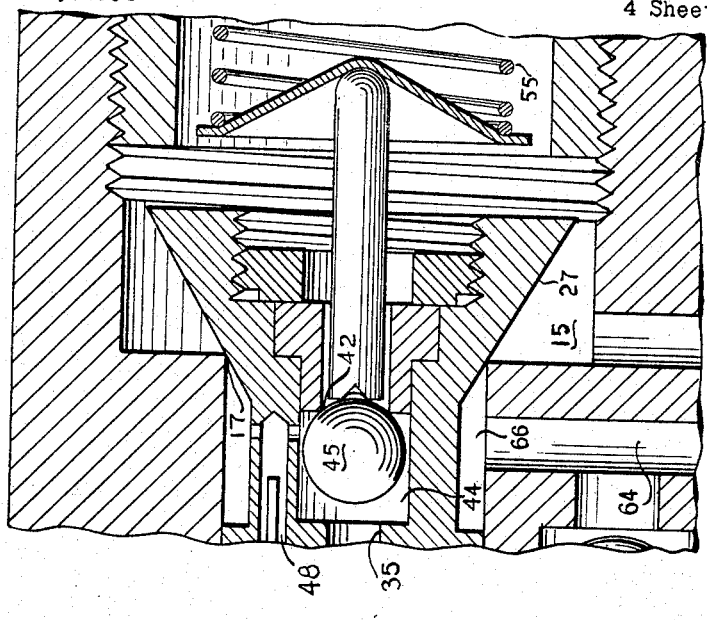

When such pressure P–1 is attained, the ball 45 will move off its seat 35, as shown in FIG. 2. As soon as this occurs, since the ball 45 fits with but little clearance, just sufficient to permit movement thereof in pilot chamber 44 which is of length just slightly greater than the diameter of ball 45, the fluid pressure P–1 will immediately be exerted against an area that is considerably larger than the area of seat 35, i.e., the cross sectional area of the ball 45 at the diameter thereof.

As a result, the force F–3 due to the product of the fluid pressure P–1 and the area of the ball will be considerably greater than the force F–1 and the ball will quickly move to the right abutting against seat 42.

Figure 3:
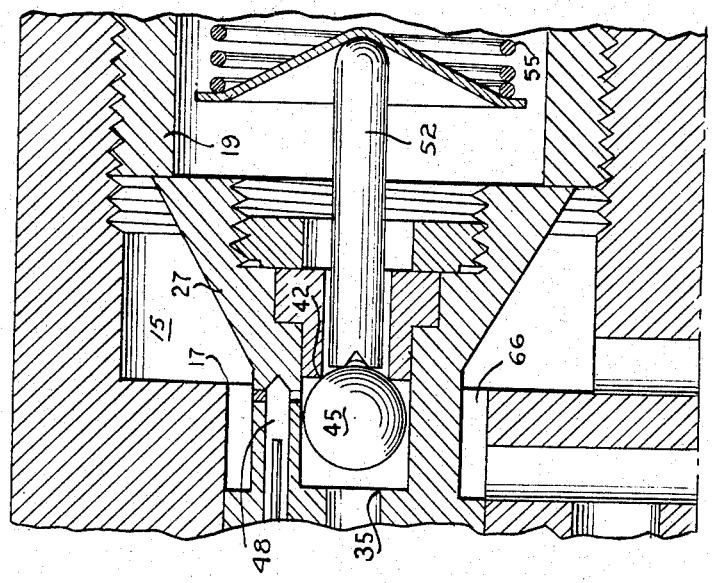

The fluid under pressure flowing into chamber 44 will also flow through passageway 48 into the expansion chamber 49 thereby reacting against the relatively large area of the end 51 of the plunger, moving the latter to the right to the position shown in FIG. 3. As the passageway 48 is of relatively small diameter, the chamber 49 will fill relatively slowly so that rapid movement to the right of the plunger 25 will not occur which could cause the ball 45 to move off its seat 42 due to the inertia of the ball 45, the pin 52 and the spring 55.

When the head 27 of plunger 25 moves away from its seat 17, communication will be provided between chamber 66 which is connected to the pump 76 and chamber 15 which is the discharge chamber and is connected to the reservoir 77.

Consequently, the pump will now force fluid directly back to the reservoir. As a result of the direct circuit of the pump to the reservoir, the pressure in passageway 64 will drop immediately so that the pressure on the side of the ball 69 adjacent seat 71 is less than that on the other side of the ball which is exposed to the pressure in the accumulator through line 79 and port 67.

Consequently, the ball 69 will immediately be moved onto its seat 71 and consequently the pressure in chamber 33 reacting against ball 45 will be the accumulator pressure and the pressure in chamber 49 reacting against the plunger 25 will also be the accumulator pressure.

As the force due to the product of the accumulator pressure in chamber 49 and the area of end 51 of plunger 25 far exceeds the force F–1 provided by spring 55, the head 27 of plunger 25 will remain spaced from seat 17.

Even though the force F–1 due to the spring 55 will increase as the plunger moves to the right, the ball 45 will still remain on its seat 42 to maintain pressure in chamber 49 which is essential in order that head 27 remain spaced from its seat 17.

This is due to the fact that when the ball 45 is against seat 42 as shown in FIG. 3, as such seat has an area illustratively twenty percent larger than seat 35, the effective area of the ball 45 against which the accumulator pressure will react is the area of seat 42. This results in a force with a given accumulator pressure that exceeds that of spring 55 even when compressed, and the amount of compression of spring 55 is controlled by the setting of sleeve 19 against the inner end of which the head 27 will abut, the movement of the plunger being illustrated by the letter "C."

Thus, the maximum force which spring 55 can obtain when compressed with a desired maximum accumulator pressure will be less than the resultant force retaining ball 45 on seat 42.

As the pressure in the accumulator drops due to flow of fluid therefrom into the hydraulic system being actuated, the pressure P₂ in chamber 33 will drop as will the pressure in chamber 49.

As soon as the force exerted by compressed spring 55 exceeds the force retaining ball 45 on its seat 42, such ball will move off its seat as shown in FIG. 4, and as the pressure on the entire surface of the ball will now be substantially the same, the compressed spring 55 will rapidly force the ball 45 onto its seat 35.

This will immediately cut off flow of fluid under pressure to chamber 49 and hence the compressed spring through pin 52 will move plunger 25 to the left to cause head 27 to move against its seat 17 thereby resetting the discharge valve.

The fluid in chamber 49 will escape through passageway 48 and pass through the small clearance around the ball 45 and through bore 43 into discharge chamber 15 for flow through port 73 and line 82 back to the reservoir.

With the valve above described, it is apparent that the pressure at which the ball 45 will move off its seat 35 to start the discharge cycle is controlled by the tension on spring 55 which may be set by adjustment plug 21.

Thus, assuming that it is desired to have the accumulator charge to a maximum pressure of say 600 p.s.i., the spring compression is adjusted so that ball 45 will move off its seat when this pressure is obtained and thereafter the unloading cycle will be completed as above described.

In the unloading position of the plunger 25, as shown in FIG. 3, the head 27 thereof will abut against the inner end of sleeve 19.

Since it is the length of stroke of the plunger that determines the additional compression of spring 55 and hence the amount of accumulator pressure drop which will permit the further compressed spring to move the ball 45 to the left against seat 35 as shown in FIG. 4, it is apparent that adjustment of sleeve 19 will provide the lower limit of accumulator pressure.

In the embodiment shown in FIG. 1a, the ball 45 of FIG. 1 is replaced by two valve heads 45a and 45b, each having a cylindrical stem 83a, 83b, preferably channelled as shown in 83c and 83d, to restrict the flow of the fluid into and out from chamber 44 to minimize the effects of the flow velocity of the fluid against the valve heads 45a and 45b.

After the valve head 45a has started to open, its further movement towards its full opened position is due to the action of the accumulator pressure in chamber 33' on the active surface of the cylindrical stem 83a and thus the opening movement is caused by a force controlled all along the stroke.

In addition, thanks to channelings 83c and 83d, in the period during which both valve heads are unseated, the pressure in chamber 44 increases up to an intermediate value, determined by the respective sizes of channelings 83c and 83d, this pressure in chamber 44 generating an increasing opening force.

In conventional poppet valves, a large play is provided between the poppet valve stem and the bore in which it is slidably mounted to allow for the passage of the fluid. Therefore, if the active surface, thus the force, determining the value at which the poppet valve starts to open is well known, on the contrary, due to the lack of precision of the play between the valve stem and the bore and thus of the flow of the fluid passing through said play, it is extremely difficult to control the further opening movement of the valve head after it has started to open.

Passageway 48 is preferably provided with conventional restriction means (not shown) to slow down the movements of the main valve 27 so that these movements take place only after the pilot valve has completed its full strokes.

As, apart from the differences mentioned above, the operation of the valve heads 45a and 45b shown in FIG. 1 and FIG. 1a is identical to that shown with respect to the ball valve in FIG. 1, it will not be further described.

The embodiment shown in FIG. 5 is substantially the same as that shown in FIGS. 1 to 4 and corresponding parts have the same reference numerals primed.

The embodiment shown in FIG. 5 incorporates a safety feature which would automatically open the discharge valve in the remote possibility that the pilot valve 45' should remain on its seat 35'. Thus the surface area of the chamber 66' adjacent head 27' is larger than the opposed active surface of chamber 49'.

This may be accomplished by providing a bore 84 defining a valve seat 17' for valve head 27', having a diameter larger than that of bore 12'. The junction between the two bores 12' and 84 is conically shaped so as to permit the introduction of piston 25' in the bore 12' without scratching the seals 30'.

Consequently, if the pressure in chamber 66' should exceed the desired maximum pressure for discharge, and attain the safety pressure of the circuit, the force developed in chamber 66' by the difference of effective area would cause head 27' to unseat.

In this embodiment, pistons 83a' and 83b' are provided with channelings 83c' and 83d' having the same function as that described with respect to the valve stems 83a, 83b of FIG. 1a.

To insure that the head will not move off its seat until the pressure in chamber 66' reaches such safety pressure, an additional spring 85, preferably homothetical to spring 55', is added. As this spring only reacts against the head 27' and not against the pilot ball 45', it does not effect its normal operation and as the force developed in chamber 49' in normal operation is far above the force developed by the two springs 55' and 85, the additional spring 85 will not effect normal operation.

The unloader valves above described may readily be fabricated at a relatively low cost, since they require relatively simple drilling operations to form the required bores and chambers in the main casing 11. By merely removing the sleeve 19 all of the working elements of the valve may then be removed and the elements of the pilot valve located in the plunger 25 may be removed by merely unscrewing nut 39.

By reason of such simple construction, it is apparent that assembly of the valve is facilitated and disassembly for maintenance may readily be accomplished.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A valve arrangement for controlling fluid pressure in a hydraulic circuit, comprising two oppositely interacting poppet valves, each poppet valve being associated with a stem slidably mounted in a bore, each stem being provided with channellings introducing different accurately controlled pressure drops, said valves being oppositely movable against two opposed seats, one of which has a smaller diameter than the other, whereby after the poppet valve associated with the smaller diameter seat has started to open, its further opening movement in controlled by the action of the hydraulic circuit pressure on the other poppet valve associated with the larger diameter seat, such action against said other poppet valve developing a force greater than the force which started the movement of the first poppet valve.

2. A valve arrangement for controlling fluid pressure in a hydraulic circuit comprising a ball member displaceable between two opposed seats provided on two opposed coaxial bores, one of said seats being of smaller diameter than the other, a piston member slidably mounted in each of said bores, each of said piston members alternatively reacting against said ball member to displace the latter from one seat to the other, each of said piston members being provided with channellings introducing different accurately controlled pressure drops, whereby after the ball member associated with the smaller diameter seat has started to open, its further opening movement is caused by the action of the hydraulic circuit pressure on the ball member which thus develops a force greater than the force which started the opening of said valve means.

3. A valve arrangement, for controlling fluid pressure in a hydraulic circuit comprising two seats with valve means cooperating with said seats, one of said seats having a smaller diameter than the other, a piston member mounted in a bore and subjected to the hydraulic circuit pressure, said piston member reacting against said valve means said piston member being further provided with channelings introducing pressure drops accurately controlled, whereby, after the valve means cooperating with the smaller diameter seat has started to open due to the action of the hydraulic circuit on said valve means, its further opening movement is caused by the action of the hydraulic circuit pressure on the piston which thus develops a force accurately controlled, independent of the action of the flow velocity on the valve means.

4. An unloader valve comprising a casing having a pressure inlet port, an additional pressure port and a discharge port, means providing communication between said pressure ports only when the pressure in said pressure inlet port exceeds the pressure in said additional pressure port, a main valve controlling communication between said pressure inlet port and said discharge port, said main valve having a pilot chamber therein having an inlet and outlet port in communication respectively with said pressure ports and said discharge port, the area of the inlet port in said chamber being less than that of the outlet port, a pilot valve in said chamber movable alternately against the ports thereof, a compression spring reacting against said pilot valve normally to retain the latter against said inlet port to close the latter and to retain said main valve member in position to cut off communication between said pressure inlet port and said discharge port, whereby when the pressure in the pressure inlet port exceeds the pressure in the additional port and the force exerted against said pilot valve exceeds the force exerted by said spring, the pilot valve will be moved from the chamber inlet port to the outlet port to close the latter, for flow of fluid under pressure into the chamber, and means controlled by the opening of said inlet port to effect movement of the main valve to provide communication between the pressure inlet port and the discharge port, whereby the drop in pressure in said pressure inlet port will cut off communication between said pressure ports so that only the additional port will be connected to said chamber.

5. The combination set forth in claim 4 in which means are provided to adjust the tension of said compression spring.

6. The combination set forth in claim 4 in which said main valve upon movement thereof to provide communication between the pressure inlet port and the discharge port further compresses said compression spring and means are provided to determine the range of movement of said main valve.

7. The combination set forth in claim 4 in which means are provided to adjust the tension of said compression spring whereby the value of pressure required to move the pilot valve away from the chamber inlet port may be determined and in which said main valve upon movement thereof to provide communication between the pressure inlet port and the discharge port further compresses and compression spring and means are provided to determine the range of movement of said main valve, whereby the value of pressure drop in said additional port required to permit movement of said pilot valve back to said chamber inlet port may be determined.

8. The combination set forth in claim 4 in which said casing has a bore, said main valve comprises a plunger slidably mounted in said bore, one end of the plunger being spaced from the end of the bore to define an expansion chamber, and a passageway extends from said pilot chamber into said expansion chamber, communication between said chambers and said pressure ports being cut off when said pilot valve is against said pilot chamber inlet port and being provided when said pilot valve is against said pilot chamber outlet port, the area of the end of the plunger in said expansion chamber being relatively large, whereby when fluid under pressure flows into said pilot chamber and said expansion chamber, sufficient force will be provided to overcome the force of said compression spring to effect movement of the main valve.

9. The combination set forth in claim 4 in which said casing has a discharge chamber, said discharge port and said chamber outlet port both being in communication with said discharge chamber, said compression spring is positioned in said discharge chamber, a pin extends axially through said chamber outlet port, one end of said pin reacting against said pilot valve and the compression spring reacting against the other end of said pin.

10. The combination set forth in claim 4 in which said casing has a bore, said additional port and said chamber inlet port are in communication with said bore, said bore having a passageway leading thereinto defining a valve seat at one end and having its other end in communication with said pressure inlet port and a valve member normally retained on said seat to close said passageway until the pressure in said pressure inlet port exceeds that in said additional port.

11. The combination set forth in claim 4 in which said casing has a bore of smaller diameter at one end and of larger diameter at the other end, said larger diameter end defining a discharge chamber, said discharge port being in communication with said discharge chamber, said smaller diameter end of the bore being closed, the junction between said bore portions defining a valve seat, said main valve comprises a plunger slidably mounted in said bore, said plunger having a frusto-conical portion at one end defining a valve head adapted to be moved against said seat, the closed end of said bore and the end of the plunger adjacent thereto defining an expansion chamber therebetween, said plunger having two longitudinally spaced peripheral annular chambers, one adjacent the valve head defining a pressure chamber and the other adjacent the other end of the plunger, said additional pressure port and said pressure inlet port being in communication with said other annular chamber and said pressure chamber respectively, said plunger having a passageway extending between said other annular chamber and said pilot chamber and a passageway extending between said pilot chamber and said expansion chamber, said compression spring being positioned in said discharge chamber, and a pin extending axially through said pilot chamber outlet port, one end of said pin reacting against said pilot valve and the compression spring reacting against the other end of said pin.

12. The combination set forth in claim 11 in which a sleeve is screwed into the end of the larger diameter portion of said casing bore, a plug is screwed into the outer end of said sleeve, said spring being compressed between said plug and the other end of said pin, said plunger valve head being adapted to abut against the inner end of said sleeve.

13. The combination set forth in claim 12 in which the end of the pressure chamber in said plunger adjacent the valve head is of larger area than the opposed end thereof whereby when the pressure in said pressure chamber exceeds a predetermined safety value the force exerted by the pressure in said pressure chamber will move the plunger valve head away from its seat.

14. The combination set forth in claim 12 in which the end of the pressure chamber in said plunger adjacent the valve head is of larger area than the opposed end thereof whereby when the pressure in said pressure chamber exceeds a predetermined safety value the force exerted by the pressure in said pressure chamber will move the plunger valve head away from its seat, and an additional spring is provided in said discharge chamber compressed between said plug and said valve head.

15. The combination set forth in claim 4 in which the area of the pilot chamber outlet port is approximately twenty percent greater than the area of the pilot chamber inlet port.

16. The combination set forth in claim 4 in which said pilot value is a ball.

17. The combination set forth in claim 4 in which said pilot valve comprises two valve members, one of said valve members having an axial stud secured thereto and extending into said pilot chamber inlet port and the other having an axial pin secured thereto at one end and extending into said pilot chamber outlet port, said compression spring reacting against the other end of said axial pin.

References Cited

UNITED STATES PATENTS 2,474,772   6/1949   Ashton _____ 137—115

WILLIAM F. O'DEA, *Primary Examiner.*

H. M. COHN, *Assistant Examiner.*